(12) United States Patent
Nottingham (10) Patent No.: US 7,726,067 B2
(45) Date of Patent: *Jun. 1, 2010

(54) HYDROMULCH ROOT BALL

(76) Inventor: George Pierce Nottingham, 3595 Aiken Ct., Wellington, FL (US) 33414

( * ) Notice: Subject to any disclaimer, the term of this patent is extended or adjusted under 35 U.S.C. 154(b) by 0 days.

This patent is subject to a terminal disclaimer.

(21) Appl. No.: 11/546,083

(22) Filed: Oct. 11, 2006

(65) Prior Publication Data
US 2008/0086941 A1 Apr. 17, 2008

(51) Int. Cl.
*A01G 23/04* (2006.01)
(52) U.S. Cl. .......................... 47/9; 47/58.1 R
(58) Field of Classification Search ............ 47/9, 47/77, 76, 32, 32.3, 32.7, 32.8, 1.01 P, 63, 47/66.3, 66.4, 84, 73, 74, 58.1 R
See application file for complete search history.

(56) References Cited

U.S. PATENT DOCUMENTS

| | | | | |
|---|---|---|---|---|
| 584,886 | A * | 6/1897 | Mead | 405/43 |
| 1,775,837 | A * | 9/1930 | Wedge | 47/74 |
| 1,775,838 | A * | 9/1930 | Wedge | 47/74 |
| 1,964,689 | A * | 6/1934 | Quillen et al. | 47/74 |
| 3,337,987 | A * | 8/1967 | Alfred | 47/9 |
| 3,447,261 | A * | 6/1969 | Hundt | 47/77 |
| 3,469,341 | A * | 9/1969 | Bourget et al. | 47/74 |
| D226,279 | S * | 2/1973 | Eyerly | D11/148 |
| 3,805,447 | A * | 4/1974 | Rion | 47/9 |
| 4,034,508 | A * | 7/1977 | Dedolph | 47/84 |
| 4,035,951 | A * | 7/1977 | Dedolph | 47/65.7 |
| 4,063,384 | A | 12/1977 | Warren et al. | |
| 4,130,072 | A | 12/1978 | Dedolph | |
| 4,422,990 | A | 12/1983 | Armstrong et al. | |
| 4,473,390 | A | 9/1984 | Teufel | |
| 4,517,764 | A | 5/1985 | Dedolph | |
| 4,858,378 | A * | 8/1989 | Helmy | 47/33 |
| 4,939,865 | A * | 7/1990 | Whitcomb et al. | 47/77 |
| 5,307,589 | A * | 5/1994 | Rigsby | 47/59 R |
| 5,312,661 | A | 5/1994 | Suzuki et al. | |
| 5,405,905 | A | 4/1995 | Darr | |
| 5,472,475 | A | 12/1995 | Adam | |

(Continued)

FOREIGN PATENT DOCUMENTS

CN 1459224 12/2003

(Continued)

OTHER PUBLICATIONS

Carey et al, Washing Seedling Roots Reduces Survival of Loblolly Pine, Fall 1998, Highlights of Architectural Research, vol. 45: 3.*

(Continued)

*Primary Examiner*—Rob Swiatek
*Assistant Examiner*—Kristen C Hayes
(74) *Attorney, Agent, or Firm*—Christie, Parker & Hale, LLP (57) ABSTRACT

A hydromulch root ball includes a root system and hydraulically compactable mulch interspersed into the root system. The hydraulically compactable mulch is interspersed into the root system by soaking the root system in an aqueous mixture of water and mulch, then draining the water away from the root system to hydraulically compact the mulch into and around the root system.

13 Claims, 5 Drawing Sheets

U.S. PATENT DOCUMENTS

| | | | |
|---|---|---|---|
| 5,580,192 A | 12/1996 | Ogawa et al. | |
| 5,590,488 A | 1/1997 | Casimaty et al. | |
| 5,662,724 A | 9/1997 | Kim | |
| 5,743,043 A | 4/1998 | Habenicht et al. | |
| 5,747,419 A | 5/1998 | Ishimoto et al. | |
| 5,855,091 A * | 1/1999 | Santoiemmo | 47/59 R |
| 5,860,244 A | 1/1999 | Casimaty et al. | |
| 5,979,112 A * | 11/1999 | Anderson | 47/66.5 |
| 6,012,251 A | 1/2000 | Siegert | |
| 6,096,373 A * | 8/2000 | Nachtman et al. | 427/136 |
| 6,302,936 B1 | 10/2001 | Adam | |
| 6,419,722 B1 | 7/2002 | Adam | |
| 6,645,267 B1 | 11/2003 | Dinel | |
| 6,698,724 B1 * | 3/2004 | Traeger et al. | 256/1 |
| 6,846,858 B2 | 1/2005 | Lemay | |
| 6,894,019 B2 | 5/2005 | Oki et al. | |
| 6,946,496 B2 | 9/2005 | Mankiewicz | |

FOREIGN PATENT DOCUMENTS

| | | | |
|---|---|---|---|
| CN | 1168373 C | | 9/2004 |
| JP | 05304844 | * | 11/1993 |
| JP | 6070651 | | 3/1994 |
| JP | 11192028 | | 7/1999 |
| JP | 11243794 | | 9/1999 |
| JP | 11313547 | | 11/1999 |
| JP | 2001088870 | | 4/2001 |
| JP | 2005000176 | | 1/2005 |
| JP | 2005333951 | | 12/2005 |

OTHER PUBLICATIONS

Certified English Language Translation of JP11192028 (Japanese patent previously cited in IDS dated Oct. 11, 2006) with Translation Certification (11 pages).

* cited by examiner

HYDROMULCH ROOT BALL

FIELD OF INVENTION

The present invention relates to protecting plant roots and more specifically to a hydromulch root ball and methods for producing a hydromulch root ball.

BACKGROUND

When a plant, such as a tree, a bush or a shrub, is harvested for transplanting, it is necessary and advisable to leave a certain amount of soil around a root system of the plant. This network of roots and the soil clinging to them is known as a root ball, no matter the shape. The root ball is necessary to provide protection, moisture and nutrients to the roots between the time the plant is harvested and the time the plant is replanted.

However, many countries in Europe, Asia, the Middle East and South America, as well as certain states within the United States (both between states and foreign countries), do not allow foreign soil to enter their borders for fear of contaminating the domestic soil with contaminants and spores, including foreign insects, microbes, bacteria and fungi. These governmental restrictions have hindered the shipment of plants between various countries because of the need for a root ball around the root system until the plant is replanted. To overcome these governmental restrictions, nurseries or resellers typically wash a plant's root system to remove the native soil and then replant the root system into a cleaned soil mixture that has been pre-approved by the various country's regulating authorities. Another common method is to wash off the native soil and then repack the root system with a dry or semi-dry filler, which often consists of saw dust, peat moss or other natural filler, in the hope that such packing will protect the root system while in transit.

These methods have various disadvantages. For example, peat moss, which is a soil by-product, may not be allowed under various applicable regulations. Further, the mixture is generally hand packed around the root system in preparation for shipping. However, hand packing results in the formation of air pockets throughout the root system, and those air pockets cause damage to and may kill the roots, particularly the finer roots that are critical to increasing the chance of survival of a plant after it is replanted. Further, this mixture lacks the structural integrity necessary to survive the rigors of shipping and handling. The saw dust and peat moss do not adhere to each other or themselves well, and therefore do not form a cohesive root ball. The mixture crumbles easily, for example, from the handling and vibrations experienced during transportation of the plant.

To help alleviate many of the problems manifest in the hand packing method, some nurseries or resellers will wash the native soil from the root system and then plant the washed root system into a container filled with a pre-approved clean soil mixture. The nursery will then hold and nurture the plant for an extended period of time, thereby allowing the plant to "root out" in the clean soil mixture. The process of rooting out involves the plant growing new roots into the clean soil mixture. Depending on the plant, this process could take from six months to two years, which delays shipping and requires considerable resources or space and maintenance.

SUMMARY

The present invention provides methods of hydraulically applying a hydraulically compactable mulch, such as hydromulch, to a root system to provide a clean hydromulch root ball that is stable and has virtually no air pockets.

In general, in one aspect, the invention features a method for producing a root ball which includes removing soil from a root system and hydraulically applying a hydromulch to the root system. The resulting root ball is then dried.

In embodiments, the soil is removed by spraying the root system with water. In other embodiments, the soil is removed by soaking the root system in water to dilute and remove the soil.

In embodiments, hydraulically applying the hydromulch includes soaking the root system in an aqueous mixture of water and the hydromulch and draining the water away from the root system to hydraulically compact the hydromulch around the root system.

In certain embodiments, the aqueous mixture of water and hydromulch is made of approximately 80 percent water by volume and 20 percent hydromulch by volume. In other embodiments, the aqueous mixture of water and hydromulch is made of approximately 40 percent water and 60 percent hydromulch.

In certain embodiments, the hydromulch may also includes additives such as tackifiers, fertilizers, or fungicides.

In other embodiments, the root system and the aqueous mixture of water and hydromulch are placed in a vessel that allows the water to be drained out of the vessel and away from the root system. In certain embodiments, the vessel is a container that can accommodate one root system. In other embodiments, the container is a two piece container that enables the root ball to be removed when the two pieces are separated.

In further embodiments, the vessel is a trough that can accommodate multiple root systems. In still other embodiments, the root ball includes multiple root systems and the trough further includes dividers to divide the root ball into individual root balls, each root ball including individual root systems. In other embodiments, the trough also includes dividers to separate the multiple root systems.

In general, in another aspect, the invention features a root ball including a root system and a hydraulically compactable mulch interspersed into the root system.

In embodiments, the soil has been removed from the root system. In certain embodiments, the soil has been removed by spraying the root system with water. In other embodiments, the soil has been removed by soaking the root system in water to dilute and remove the soil.

In embodiments, the hydraulically compactable mulch is interspersed into the root system by soaking the root system in an aqueous mixture of water and mulch and draining the water away from the root system to hydraulically compact the mulch into and around the root system. In certain embodiments, the aqueous mixture of water and mulch comprises approximately 80 percent water by volume and 20 percent hydromulch by volume. In other embodiments, the aqueous mixture of water and hydromulch comprises approximately 40 percent water and 60 percent hydromulch.

In embodiments, the mulch may further include additives such as tackifiers, fertilizers, or fungicides.

In general, in another aspect, the invention features a plant including a root system and a hydraulically compactable mulch hydraulically compacted into and around the root system to form a root ball.

In embodiments, soil has been removed from the root system. In certain embodiments, the soil has been removed by spraying the root system with water. In other embodiments, the soil has been removed by soaking the root system in water to dilute and remove the soil.

In embodiments, the hydraulically compactable mulch is hydraulically compacted into and around the root system by soaking the root system in an aqueous mixture of water and mulch and draining the water away from the root system. In certain embodiments, the aqueous mixture of water and mulch comprises approximately 80 percent water by volume and 20 percent hydromulch by volume. In other embodiments, the aqueous mixture of water and hydromulch comprises approximately 40 percent water and 60 percent hydromulch. In further embodiments, the mulch may also includes additives such as tackifiers, fertilizers, or fungicides.

The invention can be implemented to realize one or more of the following advantages. The clean hydromulch root ball has virtually no air pockets to cause serious damage to or kill the roots. Further, because the clean hydromulch root ball so thoroughly encapsulates the entire root system, even the finer roots necessary for the healthy establishment of the plant after it is replanted are protected from physical damage.

Also, the hydromulch root ball is a semi-solid mass, leading to a more stable root ball for transportation, handling and shipment. Damage to the root system caused by normal handling and vibrations of transporting a plant will be minimized. Yet, the hydromulch root ball may be at least 20-40% lighter than regular soil, thereby lowering shipping costs associated with the weight of the product shipped.

Further still, the method of applying the hydromulch to a plant's root system allows for quick preparation of the plant for transportation once the plant is removed from the ground. The hydromulch mixture may also be easily prepared with additional additives, which are more evenly dispersed throughout the mixture.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
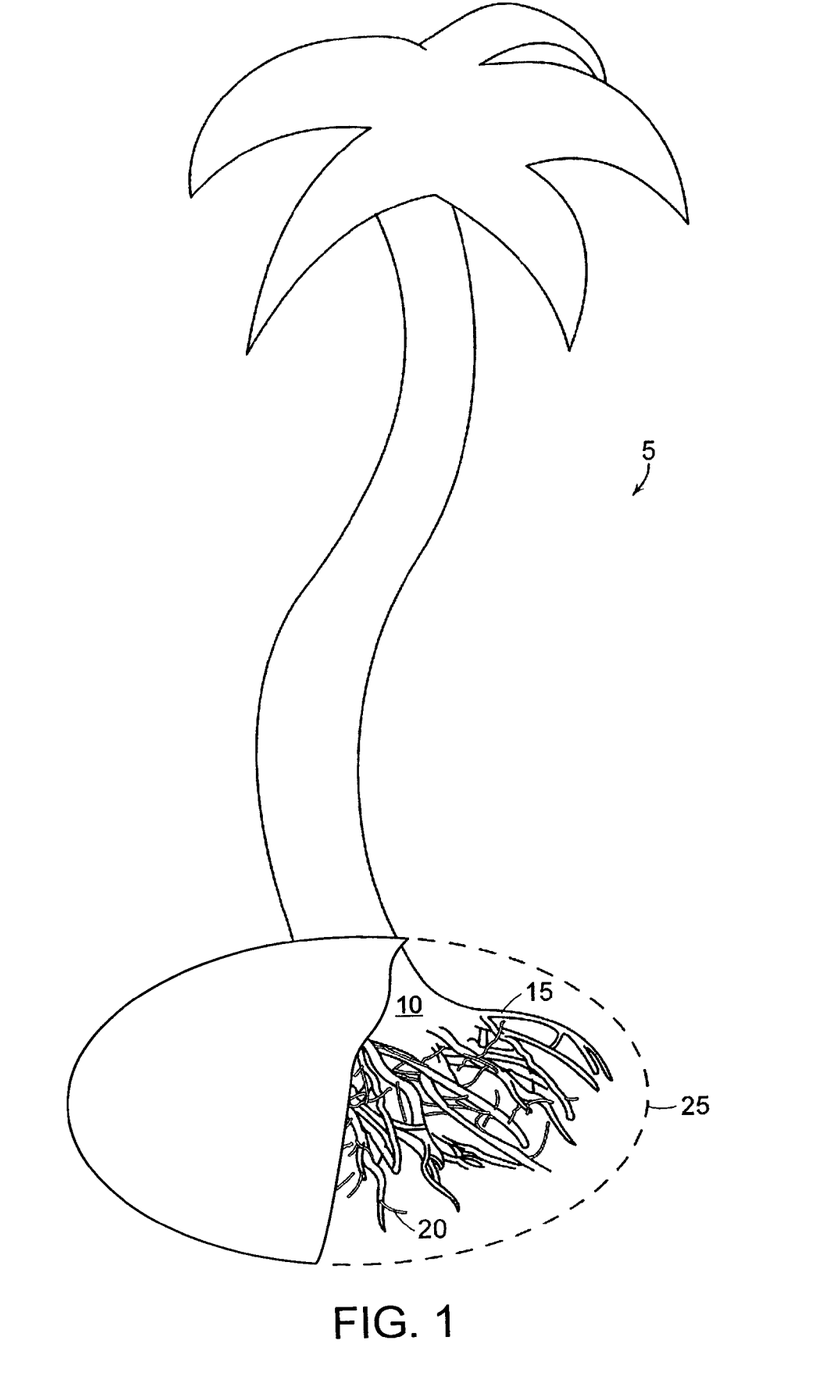
FIG. 1 is front view of a tree and its root system encapsulated in a root ball.

As shown in FIG. 1, a tree 5 includes a root system 10 (shown in detail) having larger roots 15 and finer roots 20. The finer roots 20 are important to help establish the tree when replanted because these finer roots 20 grow faster and gather more water and nutrients than the larger roots 15. The larger roots' 15 primary purpose is to provide support and anchorage for the tree 5, although they too gather water and nutrients for the tree 5. As can be seen, the root system 10 is a complex mass of larger roots 15 and finer roots 20.

When a tree 5 is removed from the ground to be transplanted, the roots 15, 20 are generally left in a root ball 25 composed of the soil from which the tree was taken. Even if a root ball is not maintained, soil will be trapped throughout the root system 10. As described above, the soil will have to be removed if the tree 5 is to be shipped to a foreign destination (e.g., exported to a foreign country).

A clean root ball (e.g., a root ball that does not contain any or minimal soil from which the tree came) can be formed around the root system 10 using a hydraulically compactable mulch, such as a hydromulch product. Hydromulch is a ground-up wood fiber product, generally cleaned using a high heat process. The wood fiber may come from trees, wood pulp, paper pulp or any other cellulose product. An example of a commercially available hydromulch is EnviroBlend® Hydraulic Mulch, available from Profile Products LLC of Conover, Buffalo Grove, Ill. The hydromulch may also include tackifiers as hardening agents (such as Con Tack® Organic Tackifier, available from Profile Products LLC of Conover, Buffalo Grove, Ill.), fertilizers or fungicides in a hydromulch mix to help nurture the tree 5 until it is replanted.

Figure 2:
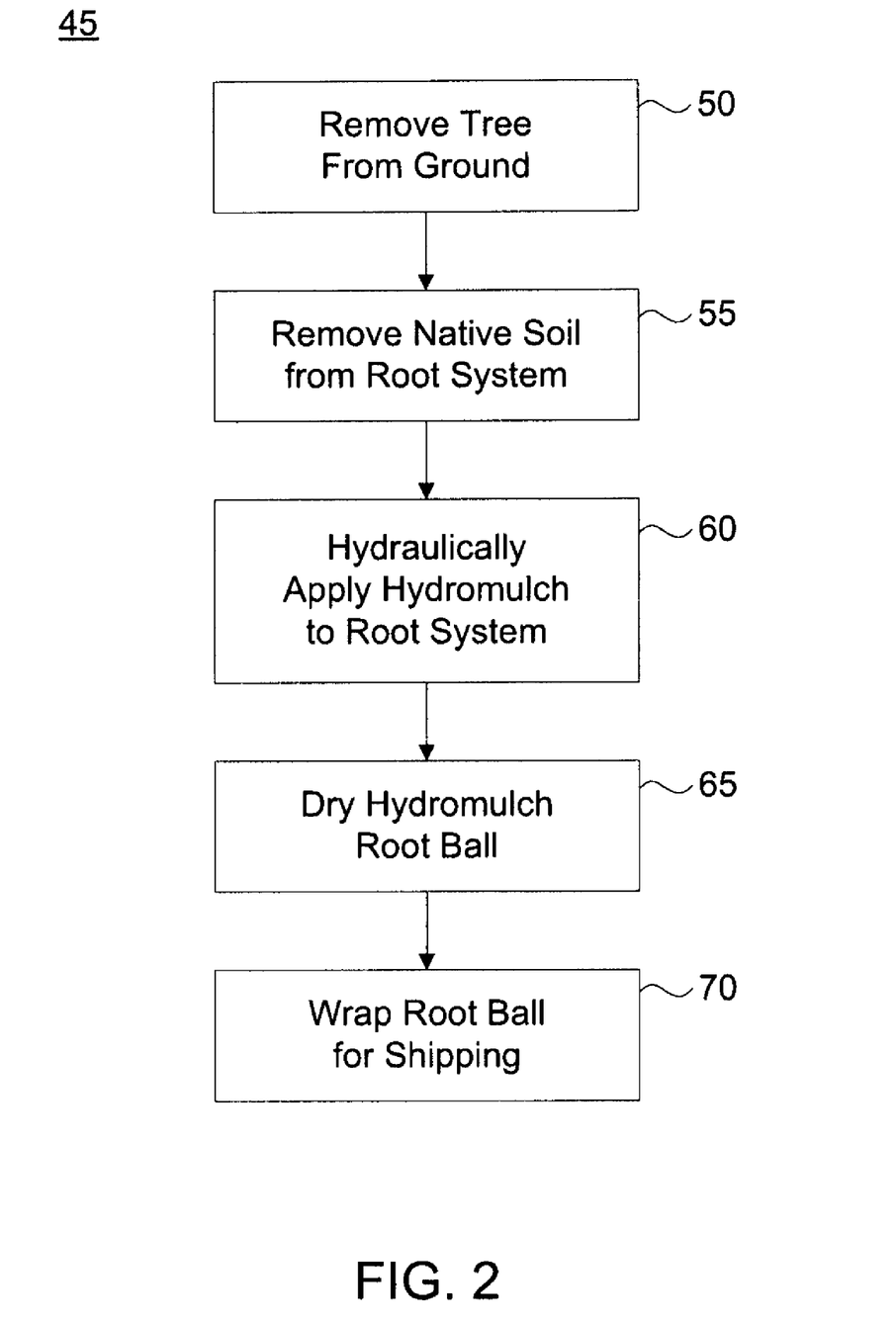
FIG. 2 is a flow diagram of general steps to encapsulate a root system according to one embodiment of the invention.

Referring to FIG. 2, an exemplary process 45 of preparing a tree 5 for shipment from a first location to a second location may include removing (50) the tree 5 and root system 10 from the ground. Removal (50) may be accomplished by, for example, digging the tree 5 out of the ground by hand. The soil is then removed (55) from the root system 10. Once all, or most of, the soil has been removed (55), the hydromulch is hydraulically applied (60) to the root system 10. The hydromulch is thereafter allowed to dry (65) around the root system 10 to form a root ball 25. If desired, the root ball 25 is then wrapped for shipment (70).

Removing the soil (55) from the root system 10 may be done utilizing water, whether the soil is in the form of a root ball 25 or simply trapped between the exposed roots 15, 20. In one embodiment, the soil may be removed (55) by manually spraying the root system 10 with a hose, thereby using the water pressure to forcibly remove the soil. In another embodiment, the soil may be removed (55) by soaking the root system 10 in a large tub of water, a lake or a pond and allowing the soil to dilute and fall out by gravity.

Figure 3:
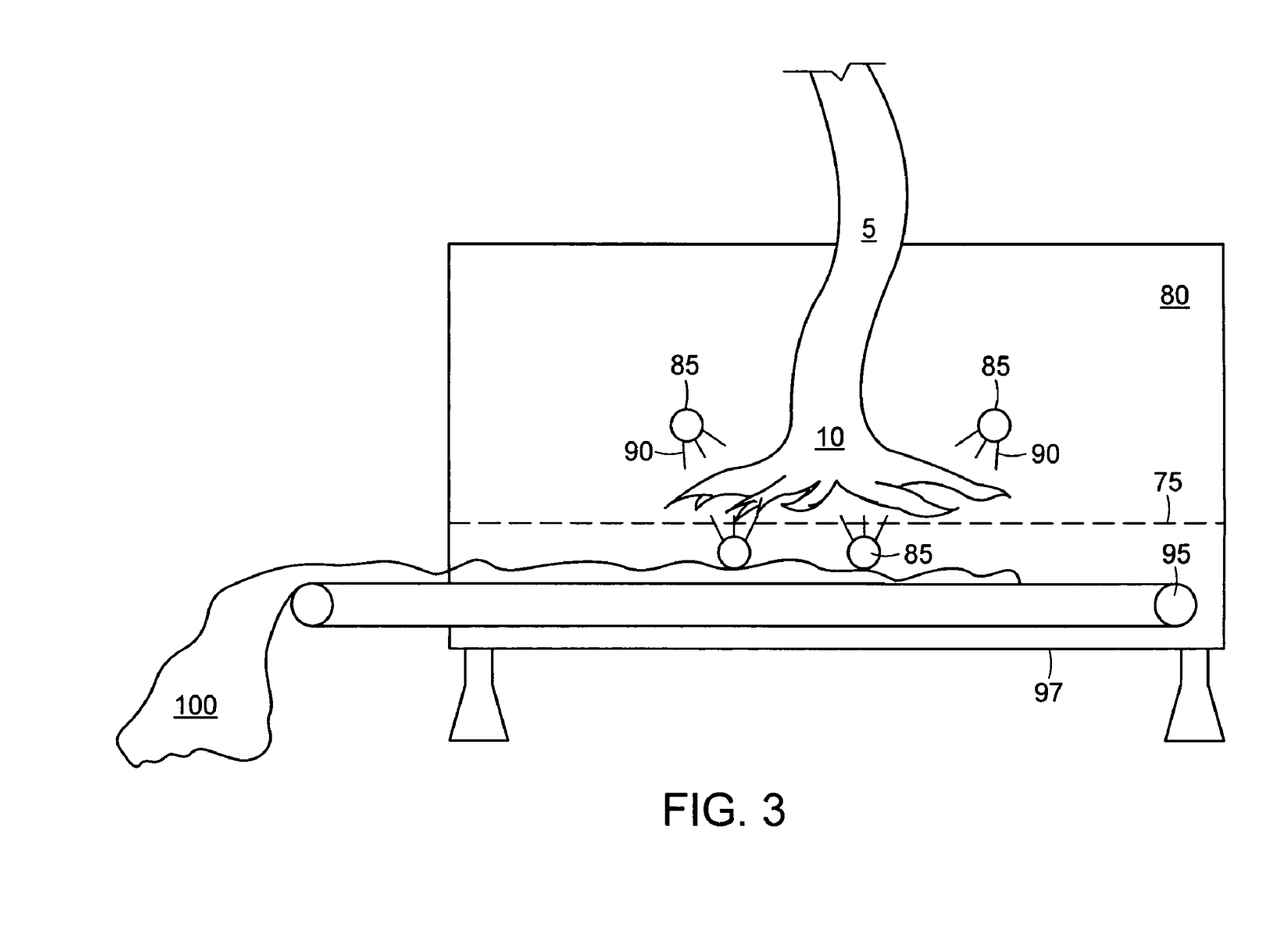
FIG. 3 is a side view of an exemplary trough in which to remove soil from a root system.

Referring to FIG. 3, in another embodiment, the soil may be removed (55) by placing the tree 5 and root system 10 (not shown in detail) onto a screen 75 in a washing trough 80. The washing trough 80 includes several water emitting jets 85 that spray water 90 onto the root system 10 from multiple angles (e.g., bottom, sides and top). The water 90 from the water emitting jets 85 impacts the root system 10 and loosens and dissolves the soil throughout the root system 10. The washing trough 80 may also include a conveyer 95 at a bottom portion 97 of the washing trough 80. The conveyer 95 may carry the removed soil 100 out of the washing trough 80, where it can be collected and removed from the facility. The water 90 in the washing trough 80 may be filtered and recycled to clean further root systems 10.

Figure 4:
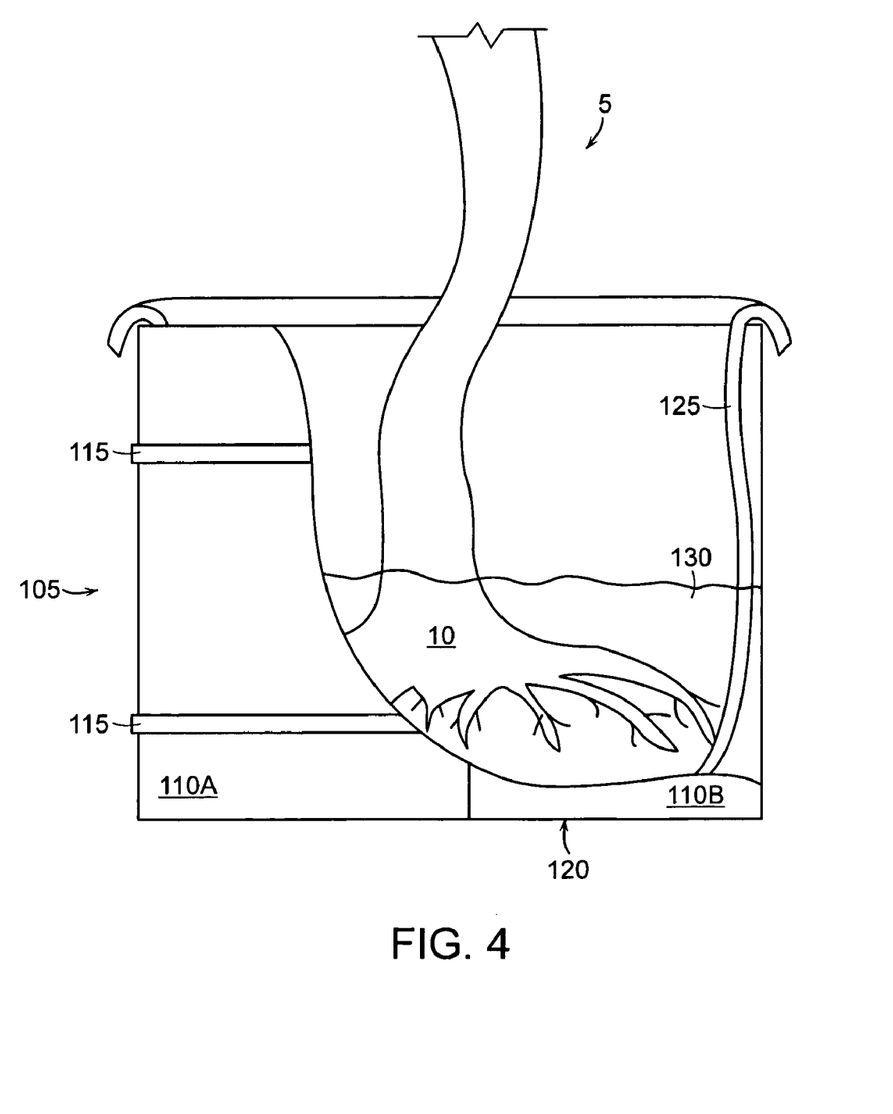
FIG. 4 is a cut-away view of an exemplary container in which to treat a root system.

Once the soil is removed from the root system 10, the root system 10 can be treated with the hydromulch, or hydromulch mix. Referring to FIG. 4, the root system 10 (not shown in detail) is placed in a container 105. The container 105 is made of two halves 110A, 110B. The container 10 may be cubical, cylindrical, or any other shape that may accommodate the root system 10 of the tree 5 or other plant. The two halves 110A, 110B are held together by removable strapping 115. The bottom 120 of the container 105 may be open or include holes (not shown) through which water can be drained. The opening or openings may include a movable door to allow the opening or openings to be sealed. A root ball wrapping material 125, such as burlap, may be used to line the container 105.

An aqueous mixture of hydromulch 130 is pumped into the container 105 to a depth sufficient to cover the root system 10. The aqueous mixture of hydromulch 130 is a mixture of hydromulch, or hydromulch mix, diluted with water. In one embodiment, the aqueous mixture of hydromulch 130 may be made up of approximately 80% water and 20% hydromulch or hydromulch mix.

The aqueous mixture of hydromulch 130 is allowed to permeate the root system 10 over a period of time. Light pressure may be applied to the aqueous mixture of hydromulch 130 to force the aqueous mixture through the entire root system 10. This pressure may come from the weight of the aqueous mixture of hydromulch 130 itself (e.g., increase the depth of the root system 10 in the aqueous mixture of hydromulch 130) or from pumping the aqueous mixture through the container 105 and root system 10. In one embodiment, the tree 5 may be sealed in the container 105 and the aqueous mixture of hydromulch 130 may be pumped into the sealed container 105. In such a system, the pressure of the aqueous mixture of hydromulch 130 may be between approximately 2 to 4 psi.

Once the aqueous mixture of hydromulch 130 has permeated through the root system 10 for a period of time, for example, approximately two hours, the water in the aqueous mixture of hydromulch 130 is drained from the container 105. As the water drains, the hydromulch in the aqueous mixture hydraulically compacts in and around the root system 10, thereby forming at least a portion of a root ball to protect the root system 10.

In one embodiment, if it is necessary to further form the root ball, a second aqueous mixture of hydromulch is pumped into the container 105 to a depth sufficient to cover the root system 10. This second aqueous mixture of hydromulch is also a mixture of hydromulch, or hydromulch mix, diluted with water. However, the hydromulch is not diluted as much as in the first aqueous mixture of hydromulch 130 (i.e., the second aqueous mixture is thicker). For example, the second aqueous mixture of hydromulch may be made up of approximately 40% water and 60% hydromulch, or hydromulch mix. Again, the second aqueous mixture of hydromulch permeates through and around the root system 10 for a period of time, for example, approximately one hour. Thereafter, the water in the second aqueous mixture of hydromulch is drained from the container 105. As the water drains, the hydromulch in the aqueous mixture will hydraulically compact in and around the root system 10 and previously formed root ball (or partial root ball), thereby forming a larger root ball or full root ball to protect the root system 10.

The root ball is then allowed to drain and dry, with no further mix aqueous mixture added, for a period of approximately three days. Once the water has been drained and the root ball has at least partially dried, the removable straps 115 are removed from the container 105 and the two halves 110A, 110B are separated to remove the tree 5 and root ball. The root ball may then be wrapped in the root ball wrapping material 125.

Once the root ball has been formed by the application of the aqueous mixture of hydromulch and removed from the container, the root ball may be further dried. As the root ball dries, it will harden. If a tackifier was added to the hydromulch, the tackifier will help further harden the root ball and enhance its handling properties.

Figure 5:
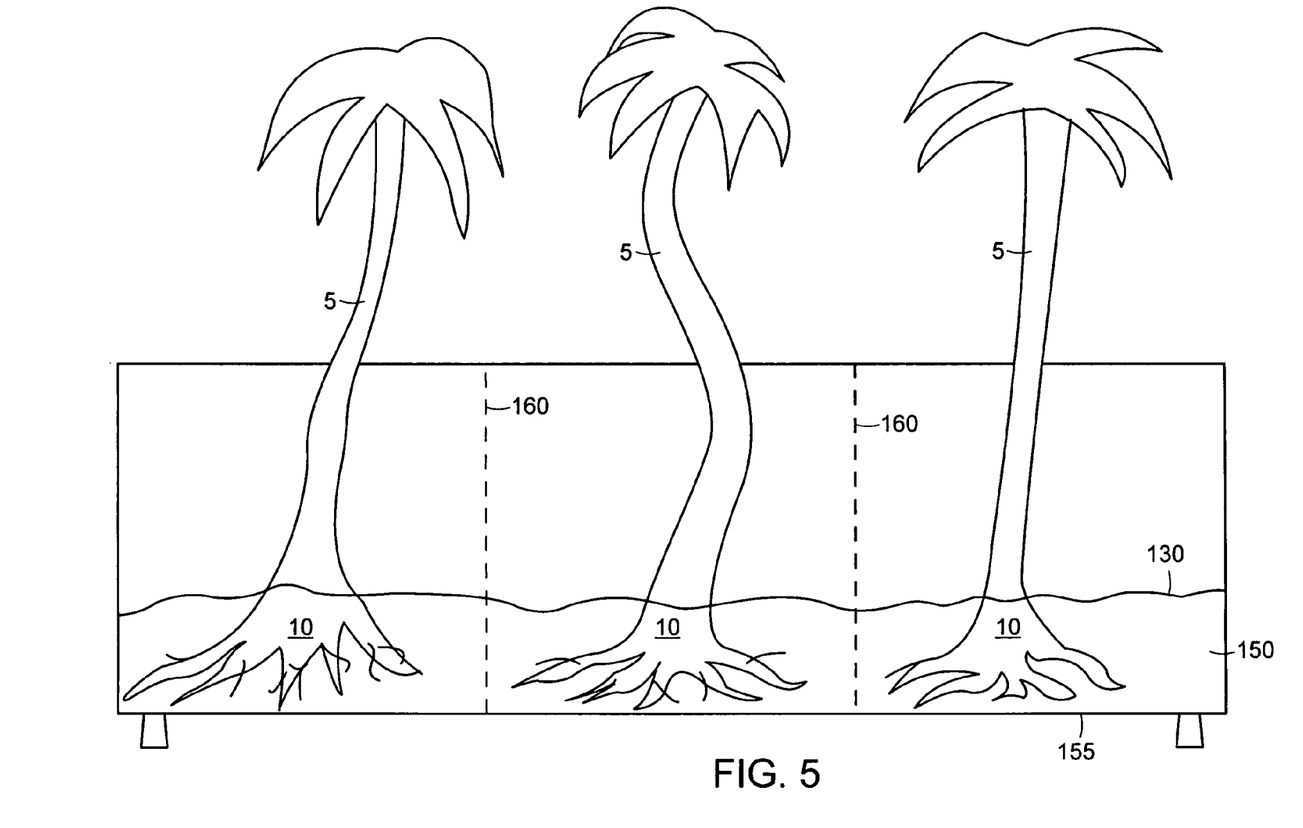
FIG. 5 is a side view of an exemplary trough in which to treat multiple root systems.

Referring to FIG. 5, several trees 5 may be placed in a treatment trough 150. The treatment trough 150 may be a long trough sized to accommodate several trees 5 at a time. The root systems 10 (not shown in detail) of the trees 5 may rest on the bottom 155 of the trough 150, or they may be suspended above the bottom 155. In one embodiment, the trough 150 may also include a screen (not shown) spaced above the bottom 155 of the trough 150 to support the root systems 10. The bottom 155 of the trough 150 may include an opening or openings (not shown) through which liquid can be drained and removed from the trough 150. The opening or openings may include a movable door to allow the opening or openings to be sealed.

An aqueous mixture of hydromulch 130 is pumped into the trough 150 to a sufficient depth to cover the root systems 10 of each of the trees 5 in the trough 150. As above, the aqueous mixture of hydromulch 130 is a mixture of hydromulch, or hydromulch mix, diluted with water. In one embodiment, the aqueous mixture of hydromulch 130 may be made up of approximately 80% water and 20% hydromulch or hydromulch mix.

The aqueous mixture of hydromulch 130 is allowed to permeate the root systems 10 of each of the trees 5 over a period of time. Light pressure may be applied to the aqueous mixture of hydromulch 130 to force the aqueous mixture through the root systems 10. This pressure may come form the weight of the aqueous mixture of hydromulch 130 itself (e.g., increase the depth of the root systems 10 in the aqueous mixture of hydromulch 130) or from pumping the aqueous mixture through the trough 150 and root systems 10. In one embodiment, the trees 5 may be sealed in the trough 150 and the aqueous mixture of hydromulch 130 may be pumped into the sealed trough 150. In such a system, the pressure of the aqueous mixture of hydromulch 130 may be between approximately 2 to 4 psi.

Once the aqueous mixture of hydromulch 130 has permeated through and around the root systems 10 for a period of time, the water in the aqueous mixture of hydromulch 130 is drained from the trough 150. As the water drains, the hydromulch in the aqueous mixture hydraulically compacts around the root systems 10, thereby forming root balls to protect the root systems 10. In one embodiment, as described above, a second, less dilute aqueous mixture of hydromulch may be pumped into the trough 150 and allowed to permeate through and around the root systems 10, and then the water is drained so that the hydromulch will hydraulically compact around the root systems 10 and previously formed root ball or partial root ball.

Once the water has been drained from the aqueous mixture of hydromulch in the trough 150, dividers 160 may be inserted between the trees 5 to divide the root balls. Since the aqueous mixture of hydromulch was added to the entire trough 150, the root balls may form as a solid mass, connecting all the trees 5 in the trough 150. The dividers 160 enable the user to separate the root balls. In another embodiment, the dividers may be added to the trough before the aqueous mixture of hydromulch is added to the trough, thus producing separate root balls.

In an embodiment, once the water has been drained from the trough, warm, dry air may be circulated throughout the trough 150. The warm, dry air will dry the root balls, further compressing them into the root system and hardening the root balls. If a tackifier was added to the hydromulch, the tackifier will further help harden the root balls and enhance their handling properties.

Once the root balls at least partially dry, they may be removed from trough 150 and wrapped in a root ball wrapping material, such as burlap, which will further protect the root balls. The root balls may then be allowed to dry further.

The root balls made by the described methods may be planted directly into the ground. The hydromulch will protect and nourish the root system 10 when it is first transplanted. Further, while the hydromulch as described herein will completely encapsulate the root system 10 in a tough root ball, the root ball will allow the root system 10 to grow in and beyond the root ball.

It is to be understood that the foregoing description is intended to illustrate and not to limit the scope of the invention, which is defined by the scope of the appended claims. Other embodiments are within the scope of the following claims. For example, while a tree has been described, the methods described can be used equally well on bushes and other plants.

Further, while certain steps have been described, more or less steps may be used. For example, after removing the soil from the root system 10, the root system could be sprayed with a fertilizer and re-rooting hormone or agent to help promote root growth. An example of a commercially available fertilizer and hormone is Superthrive®, from Vitamin Institute of North Hollywood, Calif. Such a fertilizer and hormone may be applied in a container or trough, as described above, or it could be sprayed on to the bare root system 10 after the soil has been removed.

Also, while certain pressures or mix percents have been described, the ultimate pressures and mix percentages will depend on the type of tree 5 and root system 10 on which one is working. For example, Queen Palms do not have a fine root system, and may require only an aqueous mixture of hydromulch made up of approximately 40% water and 60% hydromulch, or hydromulch mix.

Further, while a container 105 and a trough 150 have been described, any type of vessel that can accommodate the root system 10 may be used. In another embodiment, the root system 10 may be placed in a hole in the ground that is lined with plastic, so long as the aqueous mixture of hydromulch has time to permeate the entire root system 10 of the tree 5 before the water soaks into the ground and away from the root system 10.

Further still, in another embodiment, each stage of the process may be performed in a different room or area of a "clean" building. Such a clean building will lessen or eliminate the possibility that the hydromulch root balls can become contaminated during the manufacture process. For example, the root system 10 may be washed in one room. Then the tree 5 and naked root system 10 can be moved into a second room where the root system 10 is treated with the hydromulch to produce a hydromulch root ball around the root system 10. The trees 5 with the root balls are then removed and brought to another room where the root ball is packaged and readied for shipping. In each instance, the room is "clean" (e.g., free from soil, bacteria, fungi and insects).

Further still, while "clean" root balls (i.e., those having root systems that have had all or most of the soil removed) have been described, the process and resultant root ball may also be on root systems that have not had all or any of the soil removed. For example, the aqueous mixture of hydromulch may be applied to a root system having soil still interspersed with the roots. In such an embodiment, the resultant hydromulch root ball will help provide better integrity to the soil root ball and protect the roots from damage during shipping.

What is claimed is:

1. A method for producing a root ball comprising:
   removing soil from a root system;
   hydraulically applying under pressure a hydromulch comprising a finely ground-up fibrous material in an aqueous solution to the root system; and
   drying a resulting hydromulch based root ball to create an encapsulated root ball having no void spaces between individual roots in the root system.

2. The method of claim 1 wherein removing the soil comprises spraying the root system with water.

3. The method of claim 1 wherein removing the soil comprises soaking the root system in water to dilute and remove the soil.

4. The method of claim 1 wherein hydraulically applying the hydromulch comprises:
   soaking the root system in the hydromulch; and
   draining the root system to hydraulically compact the hydromulch around the root system.

5. The method of claim 4 wherein the hydromulch comprises approximately 80 percent water by volume and 20 percent finely ground-up fibrous material by volume.

6. The method of claim 4 wherein the hydromulch comprises approximately 40 percent water and 60 percent finely ground-up fibrous material.

7. The method of claim 4 wherein the root system and the hydromulch are placed in a vessel that allows the water to be drained therefrom.

8. The method of claim 7 wherein the vessel is a container that can accommodate one root system.

9. The method of claim 8 wherein the container is a two piece container that enables the root ball to be removed when the two pieces are separated.

10. The method of claim 7 wherein the vessel is a trough that can accommodate multiple root systems.

11. The method of claim 10 wherein the resulting root ball includes multiple root systems and the trough further comprises dividers to divide the root ball into individual root balls each including individual roots systems.

12. The method of claim 10 wherein the trough further comprises dividers to separate the multiple root systems.

13. The method of claim 1 wherein the hydromulch further comprises additives selected from the group consisting of tackifiers, fertilizers, and fungicides.

* * * * *